United States Patent [19]
Chisholm

[11] 3,847,585
[45] Nov. 12, 1974

[54] METHOD FOR THE PREPARATION OF MULTILAYER OPTICAL FILTERS

[75] Inventor: Douglas S. Chisholm, Midland, Mich.

[73] Assignee: The Dow Chemical Company, Midland, Mich.

[22] Filed: Jan. 8, 1973

[21] Appl. No.: 321,792

[52] U.S. Cl. .......... 65/99 A, 65/3, 65/121, 65/145, 161/164, 65/DIG. 7, 264/171, 350/151
[51] Int. Cl. .......... C03b 13/00, C03b 5/26
[58] Field of Search ..... 65/121, DIG. 7, 145, 182 R, 65/145, 3, 99 A; 350/151; 161/164; 264/171

[56] References Cited
UNITED STATES PATENTS

| | | | |
|---|---|---|---|
| 3,317,299 | 5/1967 | Bre | 65/182 R |
| 3,444,031 | 5/1969 | Schrenk | 264/171 |
| 1,946,879 | 2/1934 | Peltier | 65/121 |
| 3,523,778 | 8/1970 | Robinson | 65/121 |

*Primary Examiner*—S. Leon Bashore
*Assistant Examiner*—Frank W. Miga
*Attorney, Agent, or Firm*—Robert B. Ingraham

[57] ABSTRACT

Optical filters are prepared from transparent glasses by the formation of multilayer streams of molten glass. The optical filter is formed by flowing molten first and second glass compositions substreams and interdigitating the substreams into a composite stream on a bath and shaping the composite stream that the interfaces of the substreams are parallel to the major surface of the composite stream. By choice of layer thickness reflection can be obtained in infrared, visible ultraviolet range.

6 Claims, 6 Drawing Figures

PATENTED NOV 12 1974 3,847,585
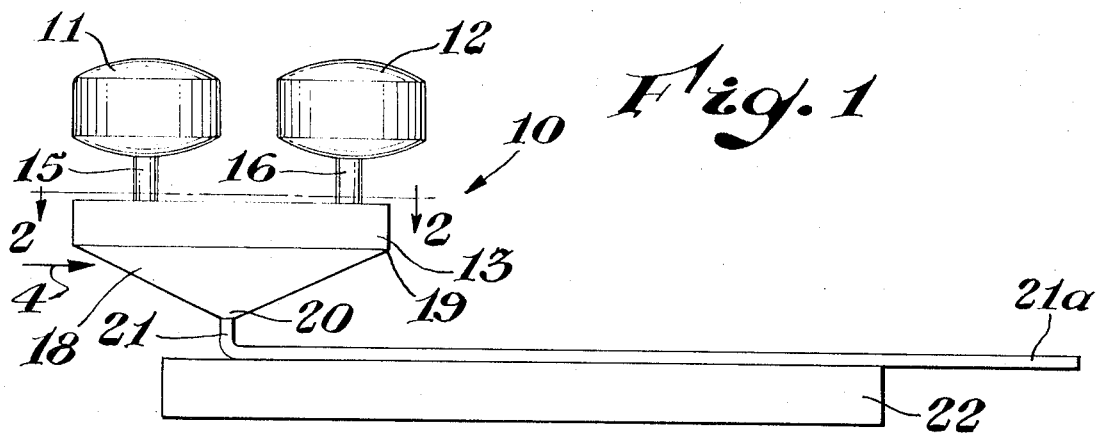
Fig. 1
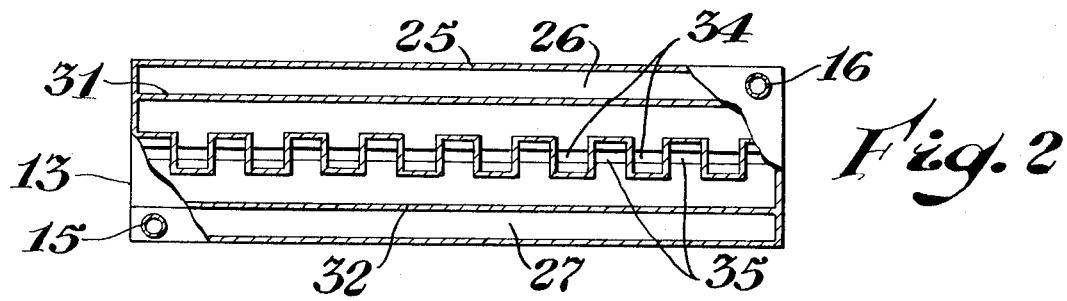
Fig. 2
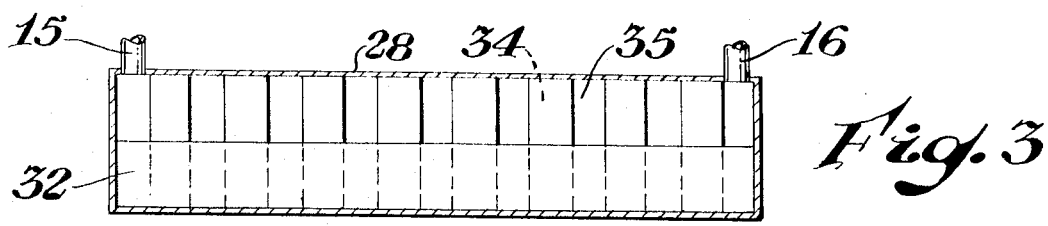
Fig. 3
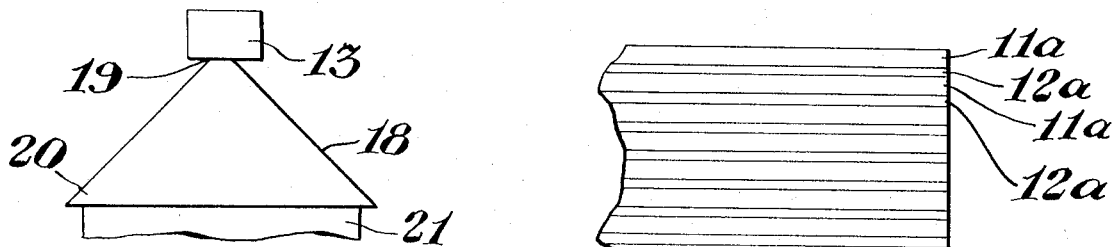
Fig. 4
Fig. 6
Fig. 5

METHOD FOR THE PREPARATION OF MULTILAYER OPTICAL FILTERS

Multilayer optical filters are well known in the art and in general have been prepared by the vapor deposition of transparent materials in a sequential manner on a generally transparent substrate. Usually such deposition is by vacuum and to prepare optical films having desired characteristics, substantial time and effort is required to produce filters of relatively small size. Typical of these multilayer optical filters are those shown in U.S. Pat. Nos. 3,297,317 and 3,427,092. The basic principle of such interference filters is well known. Reflective plastic films are known which show a generally iridescent effect and are disclosed in U.S. Pat. No. 3,576,707. Reflective optical filters would be highly desirable for many applications. For example, an infrared reflecting glass would be highly desirable for window applications in buildings, automobiles and the like. Air conditioning alone would be substantially reduced, and, indeed, in some places the need for air conditioning could be eliminated. It would also be desirable if there were available optical filters which would reflect in selective portions of the spectrum including infrared visible and ultraviolet. Employing the present techniques it is unnecessary to deposit each subsequent reflective layer.

It would be desirable if there were available an improved method for the preparation of multilayer optical filters.

It would also be desirable if there were available an improved method for the preparation of optical filters wherein optical filters could be prepared with minimal time and effort.

It would further be desirable if there were available a method for the preparation of optical filters wherein precise layer deposition is not essential.

These benefits and other advantages in accordance with the present invention are achieved in a method for the preparation of a multilayer optical filter, the steps of the method comprising providing at least first and second thermoplastic transparent glass compositions, dividing the first and second glass compositions into first and second substreams, interdigitating the first and second substreams to provide a single composite stream, deforming the single composite stream to alternate the shape of the substreams to provide the substreams with a plurality of interfaces, the interfaces being deposited in a generally parallel manner and being separated by a distance from about 0.05 micron to about 1 micron, with the further limitation that the first and second glass compositions have refractive indices which differ from each other by at least about 0.05.

The method of the present invention can be practiced with all known glasses. The only requirement with the glass is that it be transparent to light in the desired range, and that the glass can be rendered thermoplastic at a temperature which does not result in gas bubbles in the melt. For most applications it is desirable to employ glasses which have as large a refractive index difference as possible. The larger the refractive index difference the fewer the number of layers are required to obtain the desired filtering characteristics. However, glasses with relatively low refractive index difference may be employed and the number of layers increased to obtain the desired reflection characteristic. To provide the most intense color, the thickness of all the layers is not maintained constant, the thickness varies; for example, in the case of a two-component body; that is, a body having alternating layers ABABABAB. . ., the layers A may be maintained at a constant thickness, while the layers B are increased in thickness away from the surface in a regular manner such that if the thickness of layers A is designated as t, the thickness of any layer B would then be $t_b=f(n)$, wherein n designates the nth layer from the surface, or both layers may increase in a monotonic manner. By proper choice of the thickness and refractive indices of the glasses employed to prepare such a sheet, almost any desired hue, purity and brightness combination can be obtained. Reflectance can be extremely high and approaches that of the theoretical C colors (page 148, Physical Aspects of Colour by P. J. Bouma, published by N. V. Philips, Gloeilampen Fabrieken Eindhoven, the Netherlands.)

By employing anti-reflective coatings to the surface of the multilayer glass bodies, the quality of the colors is further improved as the more or less random reflection of the visible spectrum by the first surface or first surface region is substantially reduced. Such coatings are well known in the art. By proper selection of suitable transparent glass compositions, the number of layers required for such phenomenon can be reduced to as few as 5 to 6 when employing materials of high difference in refractive index. However, optically effective glass bodies are prepared from compositions having much less difference in refractive index when the layer or layers is increased.

Beneficially, the method of the present invention is desirably employed utilizing the float glass process. Such a process is disclosed in U.S. Pat. Nos. 3,083,551; 3,215,516 and 3,300,289.

The composite streams are readily prepared by the coextrusion process. A simple variety of such a process is disclosed in U.S. Pat. No. 3,523,778 wherein a single layer of a second glass is introduced into the first stream of glass. More complex coextrusion equipment suited for synthetic thermoplastic resins is disclosed in U.S. Pat. No. 3,576,707.

Further features and advantages of the present invention will become more apparent from the following specification taken in connection with the drawing wherein:

FIG. 1 schematically depicts an apparatus for the practice of the present invention.

FIGS. 2 and 3 are sectional views of the elements of the apparatus of FIG. 1.

FIG. 4 is an alternate view of a portion of FIG. 1.

FIG. 5 schematically represents an alternate feed arrangement.

FIG. 6 schematically represents a sectional view of glass prepared in accordance with the present invention.

In FIG. 1 there is schematically depicted glass producing apparatus generally designated by the reference numeral 10. The apparatus 10 comprises a first source of molten glass 11 and a second source 12 of glass of diverse refractive index. A distributor or manifold 13 is in operative communication with the sources 11 and 12 by means of conduits 15 and 16, respectively. The manifold 13 delivers a plurality of interdigitated streams from the first and second sources and the discharge thereof is in operative combination with a stream shaping means 18. The stream shaping means 18 has an inlet end 19 and a discharge end 20, and as depicted in FIG. 1, has a generally tetrahedral configuration. A stream of molten glass 21 is discharged from the discharge end 20 in the form of a sheet having a number of parallel layers of glass from the first and second sources in interdigitated relationship. The stream 21 is deposited on a float bath and discharged therefrom as the sheet 21a and subsequently cooled to ambient temperature.

FIG. 2 is a cutaway view of the distributor or manifold 13 taken along the line 2—2 of FIG. 1, and FIG. 3 is a cutaway view of the manifold as oriented in FIG. 1. The manifold 13 comprises an outer case or housing 25 defining therein a first cavity 26, a second cavity 27 and a corrugated dividing wall 28. Disposed within the first cavity 26 is a first baffle 31 and within the second cavity 27, a second baffle 32. The first cavity 26 is in operative communication with the conduit 16 and the second cavity 27 is in communication with the conduit 15. The housing 13 defines a plurality of openings 34 which permit communication between the cavity 26 and the stream shaping means 18. A similar set of openings 35 provide communication between the stream shaping means 18 and the second cavity 27. FIG. 2 is a schematic top representation of the distributor 13. FIG. 3 is a side view having the nearest wall removed.

FIG. 4 is a view of the manifold 13 and stream shaping means 18 as viewed from the location and direction as indicated by the arrow 4 of FIG. 1. The stream shaping means 18 is in effect a hollow tetrahedron wherein at least a substantial portion of the inlet 19 is along a truncated edge and the discharge 20 is along the edge remote from the inlet edge.

In operation of the apparatus as depicted in FIGS. 1–4, first and second molten glasses are provided by first and second sources 11 and 12, respectively; they are passed through the conduits 15 and 16. The first glass is discharged into the cavity 27 and is distributed therein by the baffle 32. The glass then flows through the openings 35. Similarly, the second glass is passed into the chamber 26 over the baffle 31 and flows out through the openings 34. As streams leave the openings 34 and 35 and are discharged into the inlet end 19 of the stream shaping plenum or means 18, they form a single stream which may be visualized as a striped sheet consisting of alternating portions of first and second glasses. Beneficially, the discharge 20 of the stream shaping plenum 18 is variable in order to control the width of the stream 21 being discharged therefrom. When sufficient molten glass has been added to the plenum to render it hydraulically full, streamline flow occurs, and in effect the striped sheet being discharged into the inlet 19 is narrowed in the direction of its width until the initial width has become the thickness of the sheet 21 and the portion of the striped sheet or stream which had corresponded to the original thickness becomes the width of the sheet 21. Thus, the stream 21, as it is discharged from the opening 20, contains a number of layers of the first and second glasses in alternating relationship. The interfaces between the first and second glasses are disposed generally in planes which are parallel to the major surfaces of the sheet 21a. By selecting glasses of the appropriate refractive index and number of layers, selective reflecting and transmitting glass sheets are readily prepared. As depicted in FIGS. 2 and 3, the openings 34 and 35 are of equal size. However, the openings are readily varied in width to provide laminates of a desired structure. In general the relative thickness of the layers in the glass sheet are determined by the relative width of the openings 34 and 35 under conditions of constant feed pressure and viscosity. The relative thickness of the layers are varied by any convenient means such as feed pressure, opening width, valving at the opening, temperature and the like to obtain the desired relative layer dimensions.

FIG. 5 schematically depicts a feed section 40 having a dividing wall 41. A discharge slot 42 is disposed adjacent the wall 41. When the feed section 40 is employed with the apparatus of FIG. 1, the layer distribution in the resultant sheet is relatively thick surface layers and centrally disposed thinner layers.

In FIG. 6 there is schematically depicted a cross-sectional view of a sheet such as the sheet 21a depicting a plurality of layers 11a of glass from a first source 11 and a plurality of layers 12a interdigitated therewith composed of glass from the second source 12.

By way of further illustration, a plurality of multilayer glasses are prepared generally in the manner depicted in FIG. 1 with the exception that on the lower surface a relatively thick layer of the first glass is provided and the stream such as the stream 21a is stretched in the direction of extrusion while in the thermoplastic condition to provide a maximum reflectance at a wave length of about 5800 Angstroms. A plurality of samples are prepared using a varied number of double layers. By the term "double layer" is meant a layer of the first glass and a layer of the second glass wherein each of the layers are from about 0.05 to 1 micron in thickness. The reflective layers in the samples are about 3000 Angstroms thick. A sample is prepared having two double layers, the sample having a reflectivity value of 0.085; with four double layers, a reflectivity of 0.294; with eight double layers, a reflectivity of 0.839, and with sixteen double layers a reflectivity of 0.970. The glasses employed are fluorcrown having a refractive index of 1.4785 and a very dense flint with a refractive index of 1.7167. A second series of multilayer glasses is prepared utilizing apparatus as schematically illustrated in FIGS. 1–4 and in the manner of the previous illustration, having varying numbers of double layers wherein the layer thickness is about 2700 Angstroms. The reflectivity is determined employing light having a wave length of about 5800 Angstroms. The glasses are borosilicate crown having an index refraction of 1.1510 and a dense barium crown having a refractive index of 1.6150. With two double layers, the reflectance value is 0.018; with four double layers, 0.069; with eight double layers, 0.241; with sixteen double layers, 0.626; with forty double layers, 0.981, and with sixty-four double layers, 0.992.

In a manner similar to the foregoing illustrations, other composite glass structures are prepared which are reflective in the infrared, visible and ultraviolet regions.

Beneficially for most purposes it is sufficient to provide a composite stream of glass having a desired number of layers where the first and second glasses are present in a desired relative thickness. In the thermoplastic state the reflective properties of the glass can be varied over wide limits. If relatively narrow sheets are desired, strips such as the strip 21a can be drawn rapidly away from the float bath, such as the flow bath 22 of FIG. 1. However, if relatively wide sheets are desired, the emerging strip can be restrained at the edges in the manner of conventional tentering apparatus; or alternately, the configuration of the slot 20 is varied to provide an edge bead which is engaged by suitable mechanical restraining device such as a rail or a similar guide.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of a multilayer optical filter, the steps of the method comprising
   providing at least first and second thermoplastic transparent glass compositions,
   dividing the first and second glass compositions into first and second substreams,
   interdigitating the first and second substreams to provide a single composite stream,
   deforming the single composite stream to alternate the shape of the substreams to provide the substreams with a plurality of interfaces, the interfaces being deposited in generally parallel planes which are parallel to a major surface of the composite stream and being separated by a distance from about 0.05 micron to about one micron, with the further limitation that the first and second glass compositions have refractive indices which differ from each other by at least about 0.05.

2. The method of claim 1 wherein the first and second glass compositions are interdigitated to form a stream having a plurality of alternating strips of the first and second compositions in side by side relationship, subsequently compressing the composite stream in the direction of its width and expanding the stream in the direction of its thickness to thereby provide a composite glass stream having a plurality of layers therein extending generally parallel to a major surface of the composite stream.

3. The method of claim 1 wherein the composite stream is floated on the surface of a bath.

4. The method of claim 1 wherein the composite stream is stretched to provide interfaces having the desired spacing therebetween.

5. The method of claim 1 including the step of providing at least one layer of the finished composite stream having a thickness greater than about one micron.

6. The method of claim 1 including the step of providing surface layers having thicknesses greater than about one micron.

* * * * *